(12) United States Patent
Leuca et al.

(10) Patent No.: US 6,201,797 B1
(45) Date of Patent: Mar. 13, 2001

(54) HIGH BANDWIDTH DELIVERY AND INTERNET ACCESS FOR AIRBORNE PASSENGERS

(75) Inventors: Ioan Leuca; Wen-Ping Ying, both of Bellevue, WA (US)

(73) Assignee: AT&T Wireless Services Inc., Redmond, WA (US)

( * ) Notice: Subject to any disclaimer, the term of this patent is extended or adjusted under 35 U.S.C. 154(b) by 0 days.

(21) Appl. No.: 08/989,622

(22) Filed: Dec. 12, 1997

(51) Int. Cl.[7] .................................................. H04B 7/185
(52) U.S. Cl. ........................ 370/316; 370/352; 455/12.1
(58) Field of Search .................... 370/310, 315, 370/316, 317, 319, 325, 326, 358, 352, 353, 354, 355, 356; 455/12.1, 13.1, 427

(56) References Cited

U.S. PATENT DOCUMENTS

| | | |
|---|---|---|
| 4,312,065 | 1/1982 | Ulug . |
| 4,654,867 | 3/1987 | Labedz et al. . |
| 4,730,348 | 3/1988 | MacCrisken . |
| 4,856,028 * | 8/1989 | Scales ..................................... 375/344 |
| 5,278,891 * | 1/1994 | Bhagat et al. ......................... 455/431 |
| 5,408,259 | 4/1995 | Warwick . |
| 5,408,515 * | 4/1995 | Bhagat et al. ......................... 455/431 |
| 5,438,610 * | 8/1995 | Bhagat et al. ......................... 379/431 |
| 5,499,047 | 3/1996 | Terry et al. . |
| 5,519,761 | 5/1996 | Gilhousen . |
| 5,581,703 | 12/1996 | Baugher et al. . |
| 5,592,539 | 1/1997 | Amarant et al. . |
| 5,651,050 * | 7/1997 | Bhagat et al. ......................... 455/431 |
| 5,742,601 | 4/1998 | Riedel . |
| 5,757,772 * | 5/1998 | Thornberg et al. ................... 370/236 |
| 5,790,528 * | 8/1998 | Muszynski ............................ 370/331 |
| 5,805,683 | 9/1998 | Berberich, Jr. . |
| 5,835,487 * | 11/1998 | Campanella .......................... 370/316 |
| 5,841,765 * | 11/1998 | Fielding et al. ...................... 370/319 |
| 5,852,721 * | 12/1998 | Dillion et al. ................... 395/200.47 |
| 5,953,319 * | 9/1999 | Dutta et al. .......................... 370/238 |

OTHER PUBLICATIONS

G. Losquadro, "Abate: Aeronautical Satellite Communications for Multimedia Services" *IEE Colloquium on EU's Initiatives In Satellite Communications–Mobile*, May 8, 1997, pp. 7/1–7/7, London.

Abstract No. 6046393, G. Losquadro, "EuroSky Way: Multiregional Network for Satellite Multimedia" Proceedings of Fourth European Conference on Satellite Communications, 11/18–20/97, Italy.

G. Losquadro, "Secoms: Advanced Interactive Multimedia Satellite Communications for a Variety of Compact Terminals" *Colloquium on EU's Initiatives in Satellite Communications–Mobile*, May 8, 1997, pp. 3/1–3/7, London.

* cited by examiner

*Primary Examiner*—Ajit Patel
*Assistant Examiner*—Bob A. Phunkula

(57) ABSTRACT

A method and a communications system in which a request for data transmitted by an airborne transmitter over a low-bandwidth air-to-ground communication system uplink and received by a ground-based receiver. The requested data is then transmitted over a high-bandwidth communication system downlink, such as a DBS satellite system downlink, preferably using an MPEG-2 compression technique, and received by an airborne receiver located on the same aircraft as the airborne transmitter. The received request for data is transmitted to a data network that contains the requested data, such as the Internet or a private data network, using circuit-switched techniques. According to the invention, the requested data includes one of video information, audio information and textual information.

14 Claims, 2 Drawing Sheets

HIGH BANDWIDTH DELIVERY AND INTERNET ACCESS FOR AIRBORNE PASSENGERS

CROSS REFERENCE TO RELATED APPLICATIONS

The present application is related to application Ser. No. 08/989,623, filed concurrently, and commonly assigned with the present invention and now abandoned.

BACKGROUND OF THE INVENTION

1. Field of the Invention

The present invention relates to the field of telecommunications. More particularly, the present invention relates to a method and to a system for communicating between an airborne data terminal and a ground-based computer network.

2. Description of Related Art

The ability for passengers on a commercial airline flight to make phone calls is well-known. Initially, such airborne telephone calls utilized an analog technology that was similar to that used by an airborne radio station broadcasting a modulated voice signal over a designated frequency to a ground-based station. The ground station interfaced with a Public Switched Telephony Network (PSTN) to complete the call. The analog approach suffers from problems associated with signal degradation, and requires a relatively large bandwidth for carrying a voice band signal.

An all digital air-to-ground telephony network service was introduced in 1993 in which voice signals are carried by an ISDN link on an aircraft to a radio link. Modern digital transmission and speech processing techniques are used on the voice signals before an airborne radio transmitter transmits an encoded digital voice signal to the ground where the voice signal is routed to the PSTN. The digital approach delivers a clearer voice quality than the analog approach, and allows evolving speech encoding techniques to carry more simultaneous voice calls over available communication channels.

At the time the all digital air-to-ground service was introduced, the only data service envisioned was facsimile and data modem-type calls to be made to ground-based stations or terminals. To accommodate existing facsimile and data modems that might be used on an aircraft for sending facsimile documents or for retrieving e-mail messages, a voice encoder on the aircraft used for voice calls is bypassed with a proper rate adaptation so that modem signals are send over the radio link. Still, this type of connection is considered to be a circuit-switched voice call, that is, each dialup consumes one standard voice channel. As a result, the tariff for a conventional airborne data service call is the same as the tariff for a standard voice call because the procedure for setting up the two types of calls is the same, and the bandwidth that is consumed by a conventional airborne data call is the same as the bandwidth consumed by a standard voice call. Further, the types of data services that are conveniently available through conventional airborne data service calls are severely limited because of the limited bandwidth available for a conventional airborne data call. For example, conventional airborne data services do not provide a bandwidth that is sufficient for supporting, for example, access to the Internet in which graphics, audio, video, textual and multimedia content are available.

What is needed is a way to provide an integrated voice/data service to airborne passengers that can mix various data services, such as accessing the Internet or placing a voice call, and thereby utilize the limited air channels available to airborne passengers more efficiently.

SUMMARY OF THE INVENTION

The present invention provides a method and a communications system that provides an integrated voice/data service to airborne passengers that can mix various data services, such as accessing the Internet or placing a voice call, and thereby efficiently utilizing the air channels available to airborne passengers.

The advantages of the present invention are provided by a method and a communications system in which a request for data transmitted by an airborne transmitter over a low-bandwidth air-to-ground communication system uplink and received by a ground-based receiver. The requested data is then transmitted over a high-bandwidth communication system downlink, such as a DBS satellite system downlink, preferably using an MPEG-2 compression technique, and received by an airborne receiver located on the same aircraft as the airborne transmitter. The received request for data is transmitted to a data network that contains the requested data, such as the Internet or a private data network, using circuit-switched techniques. The requests from all active data users are multiplexed on the same circuit-switched channel, thus conserving the bandwidth for normal voice channels. According to the invention, the requested data includes one of video information, audio information and textual information.

BRIEF DESCRIPTION OF THE DRAWINGS

The present invention is illustrated by way of example and not limitation in the accompanying figures in which like reference numerals indicate similar elements and in which.

DETAILED DESCRIPTION

The present invention provides a method and a system providing twoway data communications between an airborne data terminal station, such as a personal computer (PC) or a laptop computer, and a ground-based data network, such as the Internet, using a packet data switching technology. As a result, the present invention utilizes available air-to-ground bandwidth more efficiently than conventional airborne data telecommunications systems because the same air-to-ground channel is used for multiplexing data packets from different concurrent user data sessions.

Figure 1:
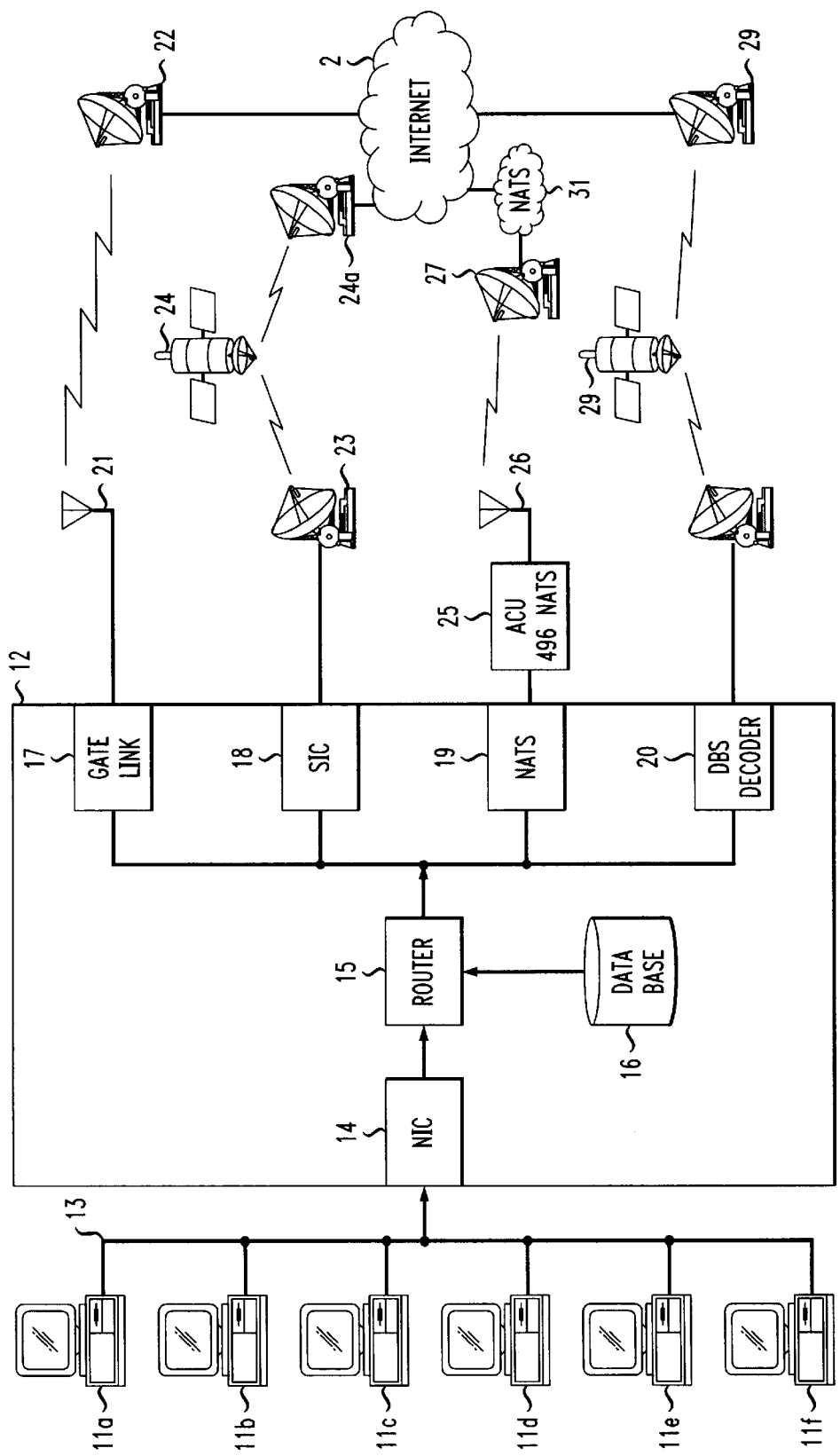
FIG. 1 shows a schematic block diagram of a telecommunications system that provides an air-to-ground communication link between an airborne telecommunication data terminal and a ground-based network according to the present invention.

FIG. 1 shows a schematic block diagram of a telecommunications system 10 that provides an air-to-ground communication link between an airborne data terminal 11, such as a PC or a laptop computer, and a ground-based network 2, such as the Internet. According to the invention, system 10 is located on an airborne platform, such as an airplane, a helicopter or a space vehicle, and includes a data transport mechanism, a data server mechanism and an Application Programming Interface (API) function. The API function is used by an external application for interacting with the data server mechanism for call control functions and for performing Operation, Administration, Maintenance and Provisioning (OAM&P) functions.

The data transport mechanism provides interfaces to and includes various data pipes that are both internal and external to the aircraft. The internal data pipes link passengers and aircraft personnel to a data server. According to the invention, the internal data pipes can be any of an existing Cabin Distribution System (CDS) using an Integrated Services Digital Network (ISDN), a Local Area Network (LAN), an Ethernet or a Fiber Distributed Data Interface (FDDI) network, and/or an Asynchronous Tranmission Mode (ATM) network for distributing video, voice/audio, and textual data signals to a display screen located, for example, on the back of passenger seats. Preferably, an ATM internal data pipe uses an embedded open standard Operating System, such as JAVA.

The external pipes can be various wireless pipes, or air links, to a ground-based station or gateway, or to a satellite system. According to the invention, the different external pipes that can be used with the present invention can be an existing terrestrial link system, such as the North American Terrestrial System (NATS) or the European Terrestrial Flight Telephone System (TFTS), a direct air link to a terrestrial gateway, a link to a Low Earth Orbit (LEO) and/or a Medium Earth Orbit (MEO) satellite system, and/or a link to one of the emerging broadband Satellite-based systems, such as the Digital Broadcast Satellite (DBS) or Teledesic systems.

In FIG. 1, system 10 includes a plurality of airborne data terminals 11, each of which are connected to a data server 12 by an internal data pipe 13, such as an Ethernet, in a well-known manner. Data terminals 11 can be data terminals 11a, 11b and 11c that are used by flight crew and personnel and data terminals 11e, 11f and 11g that are used by passengers. For example, data terminal 11a is located on the flight deck of the aircraft, while data terminals 11b and 11c are located elsewhere in the aircraft and are used by a maintenance crew and/or members of the flight crew not located on the flight deck. Data terminals 11d, 11e and 11f are dedicated data terminals provided on-board the aircraft for the convenience of passengers and/or can be portable or laptop computers provided by passengers.

Data server 12 acts as an intelligent airborne gateway and performs multiplexing and necessary call control functions. More specifically, data server 12 provides three general functions: 1) controlling various data transport interfaces; 2) multiplexing, routing, and priority queuing functions for data packets; and 3) updating and maintaining various databases depending on the application as an off-line process and for providing a uniform user interface capability (API) to client applications. Examples of off-line processes provided by data server 12 are a HyperText Transport Protocol (HTTP) process that provides an interface for Web browsing and an Aircraft Condition Monitoring System (ACMS) process for collecting aircraft flight data for OA&M purposes.

Data server 12 preferably includes a network interface circuit (NIC) 14, a router 15, a database 16, and at least one and preferably a plurality of data transport interface circuits 17–20. Network interface circuit 14 connects data server 12 to internal data pipe 13 in a well-known manner, and provides data packets received from data pipe 13 to router 15. Router 15 uses a routing table that is stored in routing table database 16 for directing data packets received from terminals 11a–11f and voice packets from telephones (not shown) to an appropriate data transport interface circuit 17–20 based on a requested data service for subsequent transmission to a particular bearer service. The components forming data server 12 can be physically enclosed within one housing or enclosure, or can be physically located in separate housings that are distributed around the aircraft depending on the technology used, the applications, and the physical constraints of the aircraft.

In FIG. 1, gate link interface circuit 17 provides well-known interface functions for an air link through an antenna 21 directly to a ground-based gateway 22. Gateway 22 is connected to data network 2, such as the Internet. Similarly, Satellite Interface Circuit (SIC) 18 provides well-known interface functions for an air link through an antenna 23 to a satellite network 24, such as an LEO or MEO satellite system. Satellite network 24 is connected to data network 2 through a ground station 24a that is a part of network 24. Exemplary satellite networks suitable for satellite network 24 include several LEO/MEO systems that are designed primarily for voice service, such as the Iridium, Globalstar, ICO and Odyssey systems. The data service provided by these exemplary satellite systems is supported only as a supplementary service having a bit rate between 1.2 to 9.6 Kbps using voice band modem signaling similar to the conventional two-way data services available from the NATS, TFTS and SATCOM.

NATS interface circuit 19 provides well-known interface functions for an air link through an Aircraft Communication Unit (ACU) 496 NATS unit 25 and an antenna 26 to a gateway 27 of an NATS-type system 31, such as AT&T's NATS network. NATS-type system 31 is connected to data network 2 using a packet data transport mechanism. The AT&T's NATS network includes approximately 150 ground stations covering the entire continental United States and parts of the Canada and Mexico. All NATS ground stations are interconnected to a switching center located in New Jersey from where voice traffic is routed to a PSTN. The NATS ground stations are also interconnected through a frame relay network to data centers, or gateways, where the data packets are routed to a private data network or to public data network 2, such as the Internet. Using a modern protocol, such as MPP combined with PPTP or L2TP, the NATS network supports an aggregated dynamic bandwidth of up to 290 Kbps in a channel block of 29 channels, subject to channel availability.

DBS decoder interface circuit 20 provides well-known interface functions for an air link through an antenna 28 to a DBS satellite system 29. DBS satellite system 29 is connected to data network 2. The broadband satellite systems, such as the Geo-synchronous Earth Orbit (GEO) Digital Broadcast Satellite (DBS), are envisioned as providing a one-way data service as the primary service. DBS technology uses an MPEG-2 digital compression system for sending a plurality of channels of digitized video signals through one transponder. The MPEG-2 digital compression system can be used for multiplexing any digital signal, including a packet data signal, and for intermixing a digital signal with a video signal for satellite broadcasting. From the point of view of the DBS system is concerned, there is no difference whether a transported signal is a compressed video signal or a sequence of IP packets.

Antenna 28 used on the aircraft must be a moving or a phased-array antenna for maintaining a line-of-sight with a transmitting satellite because DBS system is a GEO satellite system. An antenna of this type is relatively more costly than a standard fixed antenna. For other satellite systems, such as the Low Earth Orbit (LEO) satellites that are not geo-synchronous, the satellite system handles handoffs, therefore, eliminating the need for a moving-type antenna for antenna 23.

To provide an interactive airborne data service, such as e-mail retrieval or Web browsing, the present invention uses an NATS-type packet data network, such as the AT&T NATS, for an uplink data pipe and a DBS-type system for a downlink data pipe. For a typical application, the relative size, or bandwidth requirement, of the data request is small, while the amount of data returned in response to the request is relatively large. The capability of the NATS link is sufficient for carrying a request for data, but is insufficient for carrying the requested data. Alternatively, the uplink data pipe can be through an LEO/MEO satellite network 24, with the downlink data pipe being through DBS-type system 29.

Figure 2:
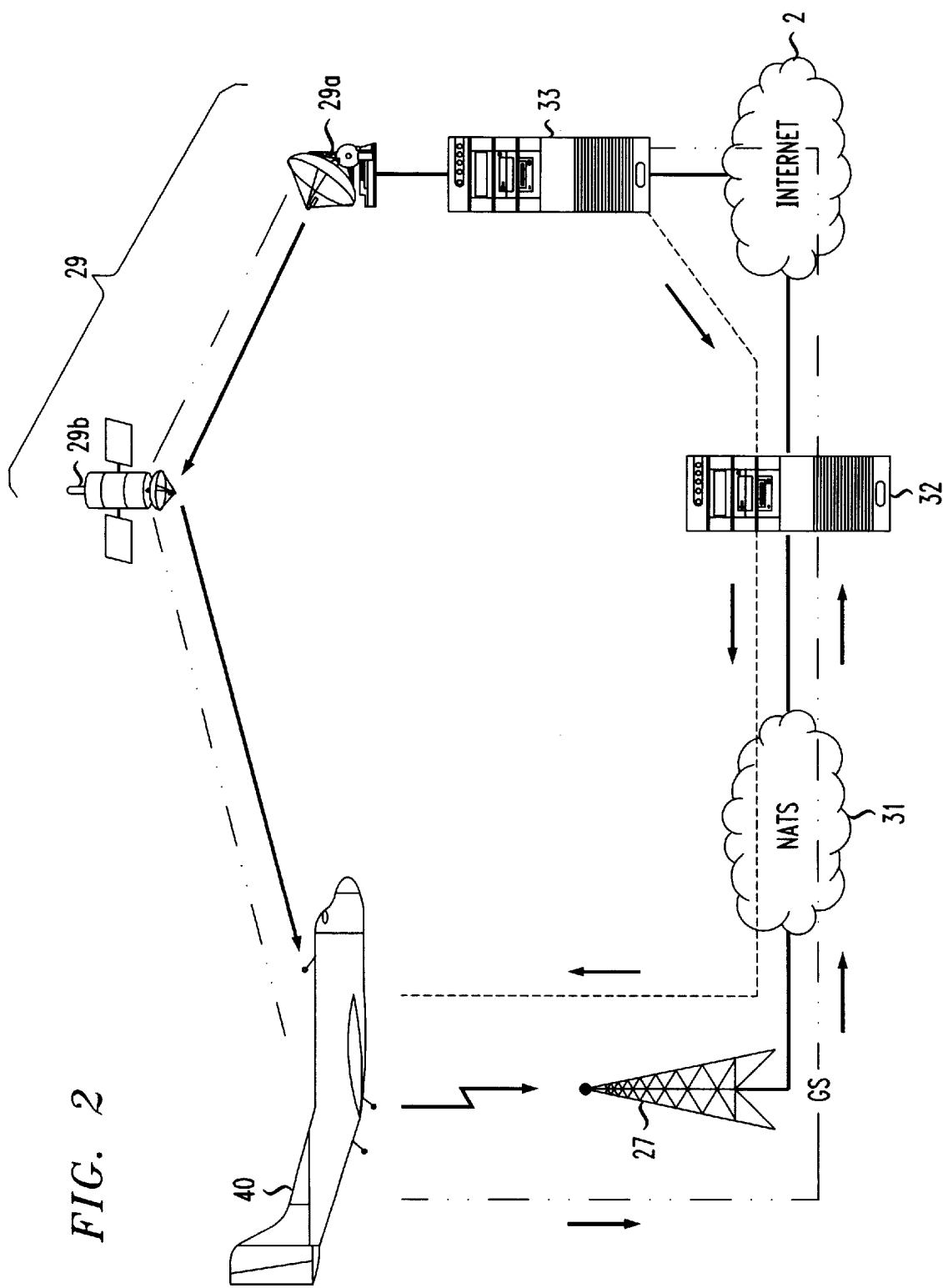
FIG. 2 is a diagram of a preferred configuration of a telecommunications system providing an NATS-type packet data network uplink and a DBS-type system downlink according to the present invention.

FIG. 2 is a diagram of a preferred configuration of a telecommunications system providing an NATS-type packet data network uplink data pipe and a DBS-type system downlink data pipe according to the present invention. System 10 uses an MPP technique that aggregates multiple on-demand 9.6 Kbps bandwidth upstream links from aircraft 40 to NATS system 31. Downstream links in excess of 5 Mbps bandwidth from the network are provided through the DBS system to the aircraft. IP packets are encapsulated by lower layer protocols so that there is a transparent conduit for IP packets to be transported from the aircraft to a desired host and from a host to the aircraft via a DBS link.

In FIG. 2, a user using a laptop computer on airplane 40 that is connected to system 10 sends an uplink data request for establishing a high-speed data session through NATS system 31. The request is sent through a second gateway 32 to a desired access management server 33. After a proper authentication process and channel assignment, access management server 33 sends a service initiation acknowledgement message to the laptop computer via NATS system 31 and terrestrial gateway 27. The laptop computer receives the service initiation acknowledgement message via NATS interface circuit 19, router 15 and internal data pipe 13 (FIG. 1). The laptop computer sends a request to a particular website on Internet 2 via NATS system 31. The desired website responds to the data request by sending the data requested to an access management server 33 that is connected to a DBS system 29. The requested data is transmitted from a ground station 29a to DBS satellite 29b, then to aircraft 40. The laptop computer receives the requested data from DBS interface circuit 20, router 15 and internal data pipe 13.

System 10 utilizes the advantages of the data compression features of DBS system 29 when downloading broadband data from a DBS satellite. An exemplary application that can be utilized by a flight crew is software downloading, flight information updates, etc. In-Flight Entertainment (IFE) services offered by an airline can receive real-time video programs from a direct television-type service, or by allowing passengers to browse the Internet with ample bandwidth.

Presently, the available DBS systems are broadcast-only systems. When a two-way DBS satellite link is available, data server 12 will treat such an uplink as another bearer service and uses the satellite broadband network for interconnecting aircraft 40 to a ground-based gateway. The bandwidth available with the two-way broadband satellite systems supports applications, such as video conferencing, high-quality video, high-speed Internet, and virtual LAN to the aircraft. An added advantage of using any of satellite systems 24, 29 is that universal access is possible so that the same system can be used anywhere on earth. For this embodiment of the present invention, the satellite network is connected to the mobile terminal on-board the aircraft, handling routing and handoffs needed for linking the mobile terminal on-board the aircraft to a ground-based gateway in a well-known manner similar to that used by conventional cellular telephone system, instead of a network of ground stations that connect the gateway. As long as an aircraft and a gateway can connect by way of a satellite network, SVCs or PVCs can be set up between any pair of terminal stations. For example, one aircraft can have an SVC to another aircraft as long as both aircraft are serviced by the satellite system. Similarly, an aircraft can have an SVC to any gateway as long as both can be connected through the satellite system.

The API function of the present invention is provided by a collection of APIs or procedures having a standardized execution environment, and can be executed by applications, whether local or remote, for allowing the configuration of call/data routes, monitoring and reporting of activities, and messaging and presentation of data to users. An example of an API that can be used with the present invention are JAVA applets that can be executed by any JAVA-capable Web browser for allowing a flight crew to view the latest gate link information or for ground control personnel to view the vital statistics of the aircraft in real time.

The API function of the present invention is the enabling tool for allowing quick introduction of new applications and/or services, for developing specific applications for call monitoring and control purposes, and for incorporating new technologies without significant development effort. The APIs used with the present invention are highly modularized so that any combination of APIs can be incorporated into creating new applications without having impact on existing applications.

Preferably, the present invention uses the TCP/IP protocol as a networking protocol, thus allowing interconnection to virtually any network. An additional advantage of the present invention is that the ability to access to the vast collection of TCP/IP protocols, tools and applications provides the present invention with the flexibility to meet the needs of future aircraft data services. The present invention is expandable by providing an infrastructure that is modularized and is designed to use Open System interfaces, allowing new hardware and technologies to be incorporated with minimal development. Preferably, the present invention uses COTS hardware and software.

What is claimed is:

1. A method for air to ground communication, comprising the steps of:

(a) transmitting a request for a data session from an airborne terminal via an airborne transceiver and first antenna using a low bandwidth downlink to a ground based gateway linked to a server connected to a data network;

(b) transmitting a service initiation acknowledgement from the server to the airborne terminal via the ground based gateway, the low bandwidth downlink, the airborne transceiver and first antenna;

(c) transmitting a data request from the airborne terminal to the data network via the airborne transceiver and first antenna, low bandwidth down link, the ground based gateway and the server; and (d) transmitting the requested data from the data network to the airborne terminal via a high bandwidth satellite uplink, an airborne receiver and second antenna.

2. The method according to claim 1, wherein the uplink is part of a DBS satellite system.

3. The method according to claim 1, wherein the data network is the Internet.

4. The method according to claim 1, wherein the data network is a private network.

5. The method according to claim 1, wherein the step of transmitting the requested data over the high-bandwidth communication system uplink includes the step of using an MPEG-2 compression technique for transmitting the requested data over the high-bandwidth communication system uplink using the second antenna.

6. The method according to claim 1, wherein the requested data includes one of video information, audio information and textual information.

7. The method of claim 1 further comprising the step of:
   (e) using an access management server to obtain the requested data from the data network and transmit the requested data to the airborne terminal via the high bandwidth satellite uplink and the airborne receiver and second antenna.

8. An air to ground communication system, comprising
   (a) an airborne terminal coupled to an airborne transceiver and first antenna;
   (b) a low bandwidth downlink provided by the airborne transceiver and first antenna;
   (c) a ground based gateway for receiving the low bandwidth down link;
   (d) a data network coupled to the ground based gateway via a server;
   (e) a high bandwidth satellite uplink coupled to the data network; and
   (f) an airborne receiver and second antenna coupled to the uplink whereby a data request from the airborne terminal is transmitted to the data network via the airborne transceiver and first antenna, the low bandwidth down link, the ground based gateway and the server and the requested data is transmitted by the data network to the airborne terminal via the high bandwidth satellite uplink and the airborne receiver and second antenna.

9. The system according to claim 8, wherein the uplink is part of a DBS satellite system.

10. The system according to claim 8, wherein the data network is the Internet.

11. The system according to claim 8, wherein the data network is a private network.

12. The system according to claim 8, wherein the DBS satellite system uses an MPEG-2 compression technique for transmitting the requested data over the high-bandwidth communication system uplink using the second antenna.

13. The system according to claim 8, wherein the requested data includes one of video information, audio information and textual information.

14. The system of claim 8 further comprising:
   (g) an access management server coupled to the data network for obtaining and transmitting the requested data via the high bandwidth satellite uplink and the airborne receiver and second antenna.

* * * * *